United States Patent
Podhorsky et al.

(10) Patent No.: US 12,522,118 B2
(45) Date of Patent: Jan. 13, 2026

(54) VEHICLE SEAT WITH FEATURES TO ENHANCE LAP BELT EFFECTIVENESS

(71) Applicant: Lear Corporation, Southfield, MI (US)

(72) Inventors: Marian Podhorsky, Presov (SK); Michal Dubravcik, Presov (SK); Peter Jenco, Presov (SK); Martin Lipovsky, Presov (SK); Miroslav Halzak, Presov (SK)

(73) Assignee: Lear Corporation, Southfield, MI (US)

(*) Notice: Subject to any disclaimer, the term of this patent is extended or adjusted under 35 U.S.C. 154(b) by 146 days.

(21) Appl. No.: 18/354,292

(22) Filed: Jul. 18, 2023

(65) Prior Publication Data
US 2025/0026255 A1 Jan. 23, 2025

(51) Int. Cl.
*B60N 2/427* (2006.01)
*B60N 2/68* (2006.01)
*B60N 2/70* (2006.01)

(52) U.S. Cl.
CPC ....... *B60N 2/7094* (2013.01); *B60N 2/42718* (2013.01); *B60N 2/68* (2013.01)

(58) Field of Classification Search
CPC ........... B60N 2/42763; B60N 2/42718; B60N 2/7094; B60N 2/4263
See application file for complete search history.

(56) References Cited

U.S. PATENT DOCUMENTS

| | | | |
|---|---|---|---|
| 6,672,667 B1 | 1/2004 | Park | |
| 6,746,077 B2 | 6/2004 | Klukowski | |
| 6,908,149 B1 | 6/2005 | Yamaguchi et al. | |
| 8,240,758 B2 | 8/2012 | Combest | |
| 8,297,697 B2 | 10/2012 | Gross et al. | |
| 10,632,874 B2* | 4/2020 | Jonsson | B60N 2/4242 |
| 10,793,032 B2* | 10/2020 | Ando | B60N 2/4221 |
| 10,988,058 B1 | 4/2021 | Bharsakale et al. | |
| 2015/0091338 A1* | 4/2015 | Hayashi | B60N 2/62 |
| | | | 297/313 |

(Continued)

FOREIGN PATENT DOCUMENTS

| | | | |
|---|---|---|---|
| CN | 115384364 A | * 11/2022 | |
| CN | 116039476 A | * 5/2023 | B60N 2/68 |

(Continued)

OTHER PUBLICATIONS

German Office Action with English translation for Application No. 10 2024 116 464.4, dated Nov. 17, 2025, 4 pages.

*Primary Examiner* — Timothy J Brindley
(74) *Attorney, Agent, or Firm* — Brooks Kushman P.C.

(57) ABSTRACT

A vehicle seat includes an anti-submarining feature which enhances the effectiveness of the lap belt. The seat includes a seat frame with two side rails joined by front and rear tubes. A trigger mechanism includes two arms pivotably supported by the front tube. The two arms support a cross tube. A flexible mat is supported by the cross tube and the rear tube. In normal operation, the arms are prevented from rotating about the front tube by cam lobes which contact a trigger rod. In a front collision, the occupant's inertia, acting through the flexible mat, deforms the trigger rod releasing the trigger mechanism. The cross tube pivots upward and rearward. A missile portion of the flexible mat moves downward.

20 Claims, 4 Drawing Sheets

(56) References Cited

U.S. PATENT DOCUMENTS

| | | | | |
|---|---|---|---|---|
| 2016/0016492 A1* | 1/2016 | Subramanian | ..... | B60N 2/42763 297/216.1 |
| 2020/0114788 A1* | 4/2020 | Jaradi | ................ | B60N 2/42763 |
| 2021/0078469 A1* | 3/2021 | Humer | ............... | B60N 2/02246 |

FOREIGN PATENT DOCUMENTS

| | | | | | |
|---|---|---|---|---|---|
| DE | 3624398 | C2 | 6/1996 | | |
| DE | 69931427 | T2 | 11/2006 | | |
| DE | 102014219175 | A1 | 4/2015 | | |
| DE | 202015103125 | U1 | 7/2015 | | |
| EP | 1415853 | A2 * | 5/2004 | ......... | B60N 2/42763 |
| FR | 3102417 | A1 * | 4/2021 | ......... | B60N 2/42763 |

\* cited by examiner

VEHICLE SEAT WITH FEATURES TO ENHANCE LAP BELT EFFECTIVENESS

TECHNICAL FIELD

The present disclosure relates to a vehicle seat assembly. More particularly, it relates to a seat frame with active features to prevent occupant submarining in a collision.

DETAILED DESCRIPTION

Figure 1:
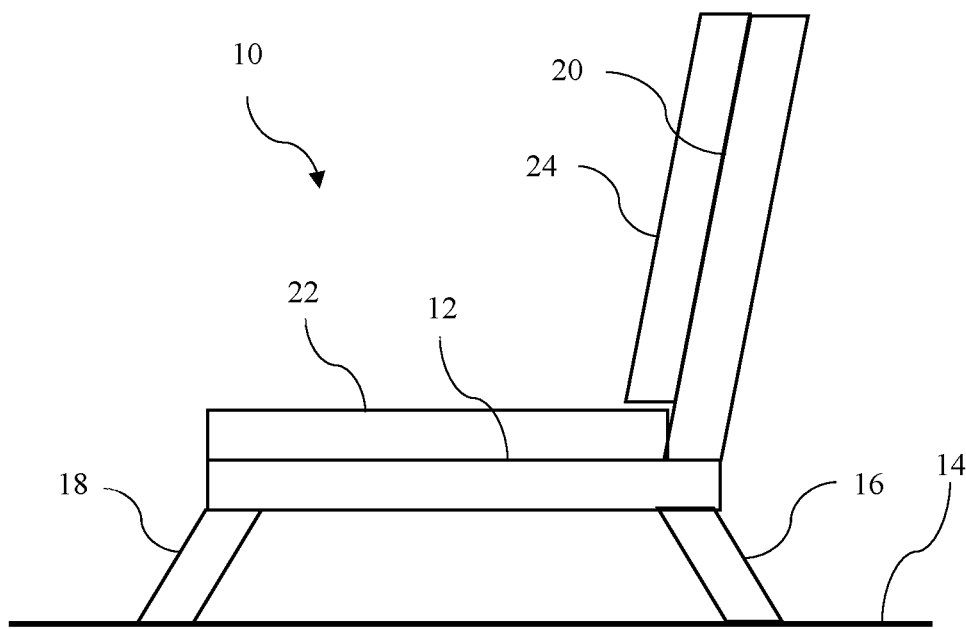
FIG. 1 is schematic diagram of a vehicle seat.

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 schematically illustrates a vehicle seat 10. The seat includes a base frame 12 which is attached to the vehicle floor 14 by rear legs 16 and a front legs 18. The legs may be adjustable to adjust the height or tilt of the seat. A back frame 20 is attached to the base frame 12. The back frame 20 may be pivotably attached to the base frame 12 such that it can be adjusted for occupant comfort. A seat cushion 22 is attached to the base frame and a back cushion 24 is attached to the back frame 20. The seat cushion and back cushion are designed for occupant comfort and to make the seat aesthetically pleasing.

Seat belt attachment points may be included in the vehicle seat structure or may be attached directly to the vehicle structure. The seat belts may include a lap belt and a shoulder harness. The seat belt is intended to hold the occupant in the seat in the event of a collision. In the event of a frontal impact collision, an occupant may have a tendency to slide under the lap belt in a phenomenon called submarining. If submarining occurs, the likelihood of serious injury is increased.

Figure 2:
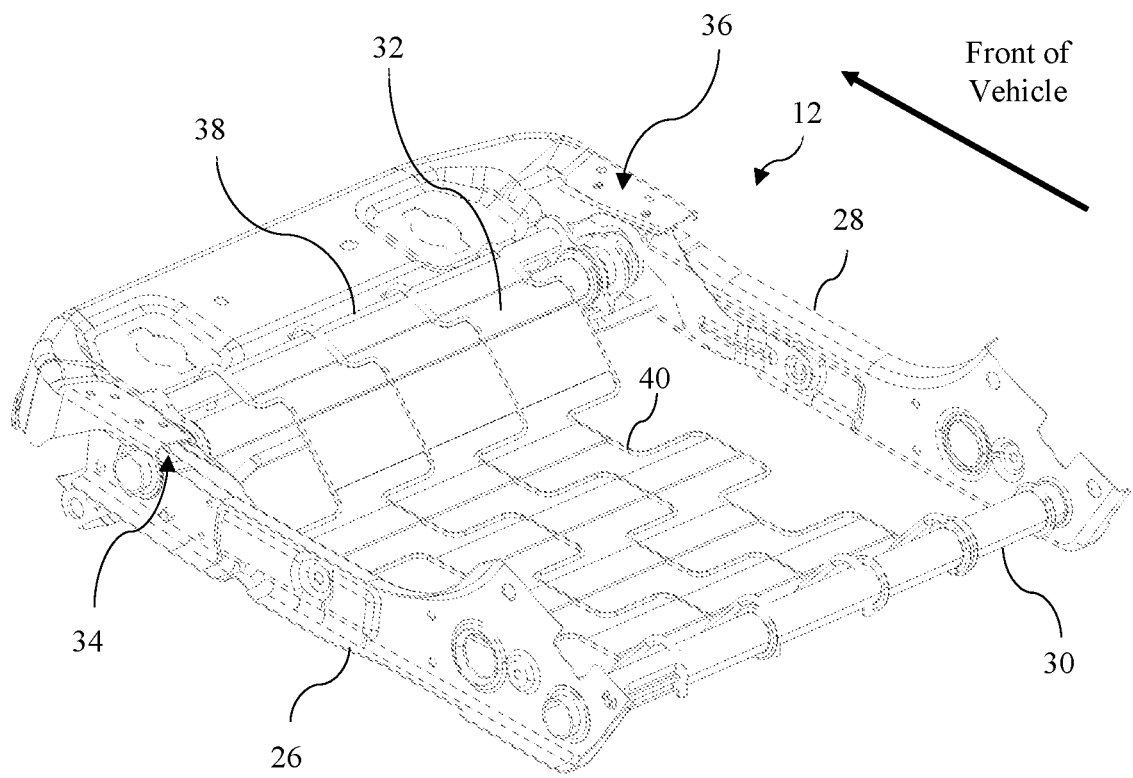
FIG. 2 is pictorial view of a seat frame for the vehicle seat of FIG. 1.

FIG. 2 is a pictorial view of the base frame 12. The base frame includes a left side rail 26 and a right side rail 28 joined to one another by a rear tube 30 and a front tube 32. Left 34 and right 36 trigger mechanisms position a cross tube 38. Although two trigger mechanisms are show in the illustrated embodiment, other embodiments may use one trigger mechanism or more than two trigger mechanisms. The tubes of the illustrated embodiment are hollow tubes with a circular cross section, but other cross-sectional shapes may be utilized. A flexible mat 40 is supported at the rear by rear tube 30 and supported at the front by cross tube 38. Seat cushion 22 rests on flexible mat 40. Directional terms such as left, right, front, rear, above, below, forward, rearward, upward, downward, etc. are relative to an installed orientation of the seat in a vehicle. For a vehicle seat that is not currently installed in a vehicle, the terms should be interpreted in an internally consistent manner. For example, right is always opposite of left, above is always opposite of below, etc.

Figure 3:
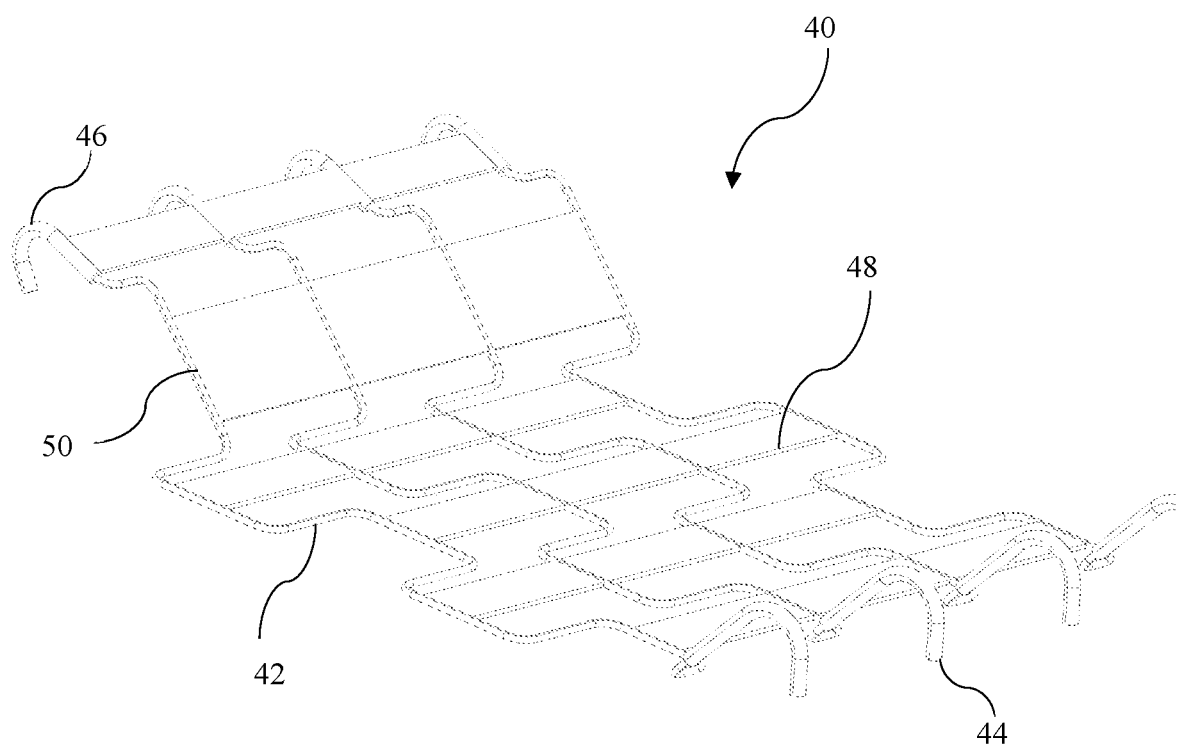
FIG. 3 is pictorial view of a flexible mat of the seat frame of FIG. 2.

The flexible mat 40 is illustrated in more detail in FIG. 3. A set of longitudinal wires 42 (four in the illustrated embodiment) are supported on the rear tube 30 by rear hooks 44 and supported on the cross tube 38 by front hooks 46. Each longitudinal wire includes a number of sharp bends of roughly 90 degrees. The longitudinal wires 42 are spaced relative to one another by connection with a number of lateral wires 48. The mat acts somewhat like a spring. Sections of the mat can be stretched out by deflecting the longitudinal wires at the sharp bends changing the distance between adjacent lateral wires. A plate 50 is attached to the longitudinal wires making one portion of the flexible mat effectively rigid.

Figure 4:
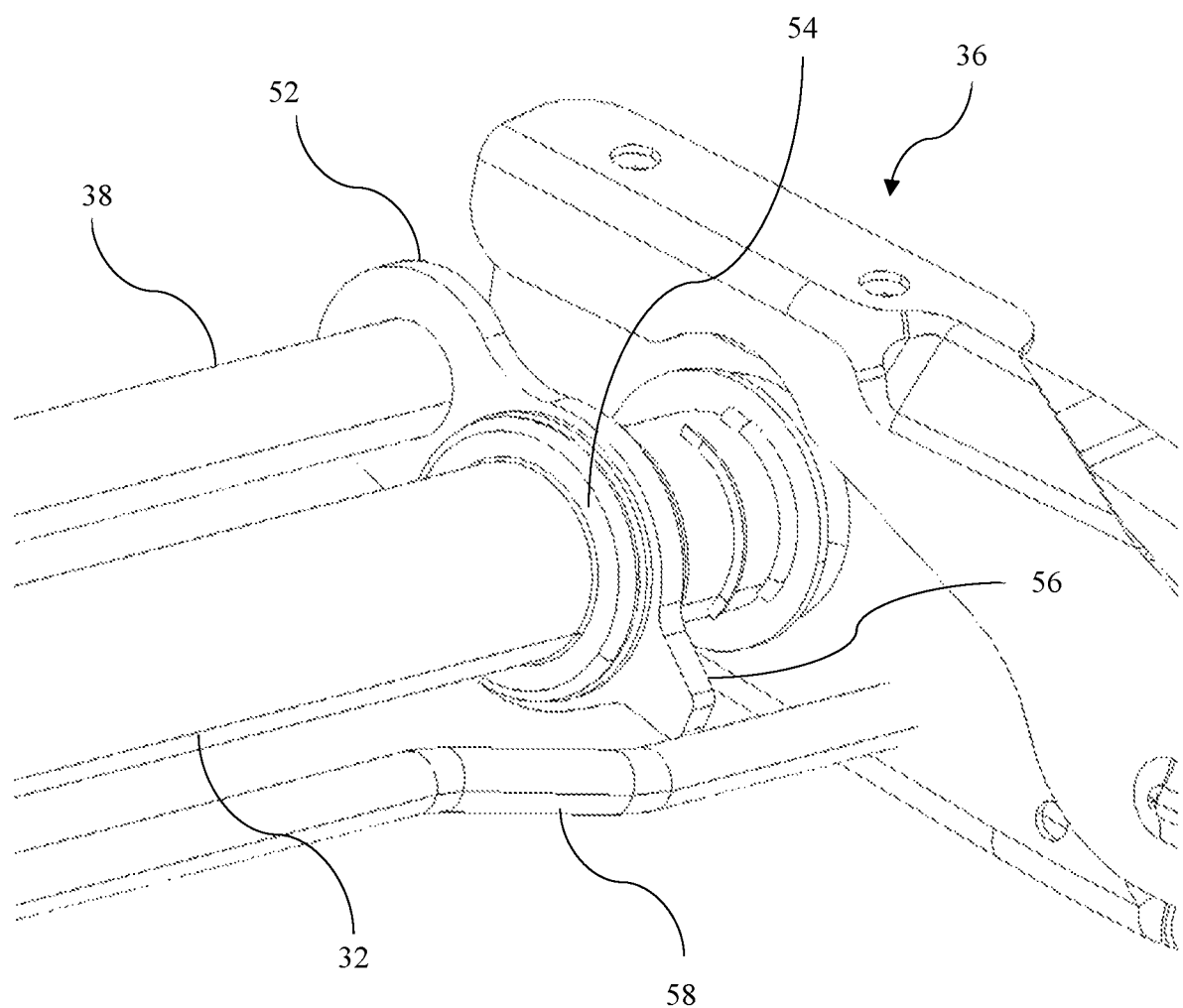
FIG. 4 is pictorial view of a trigger mechanism of the vehicle seat of FIG. 1.

FIG. 4 shows the right trigger mechanism 36 in a nominal condition. Left trigger mechanism 34 is a mirror image of right trigger mechanism. Arm 52 is supported for rotation with respect to front tube 32 by a bushing 54. Cross tube 38 is fixed to arm 52 and to the corresponding arm of the left trigger mechanism. Cross tube 38 may therefore rotate around front tube 32 while remaining parallel to front tube 32. Arm 52 includes a cam lobe 56. In the condition illustrated in FIG. 4, cam lobe 56 contacts trigger rod 58 holding arm 52 in place rotationally. Trigger rod 58 is supported between the left side rail and the right side rail. Plate 50 of the flexible mat 40 contacts a central portion of trigger rod 58. In the event of a front impact collision, the occupant's inertia pushes forward and down on the plate 50 through the seat cushion. This force, if it exceeds a threshold magnitude, deflects the trigger rod 58 away from cam lobe 56 such that arm 52, and the corresponding arm on the left side of the seat, are free to rotate. The force is directed below an axis of rotation of the arm. Due to this moment, the flexible mat 40 pulls against the top of the cross tube 38 causing the arm to rotate. Rotation of the arm places the cross tube 38 in a position that is higher and rearward of the position in the normal condition.

Figure 5:
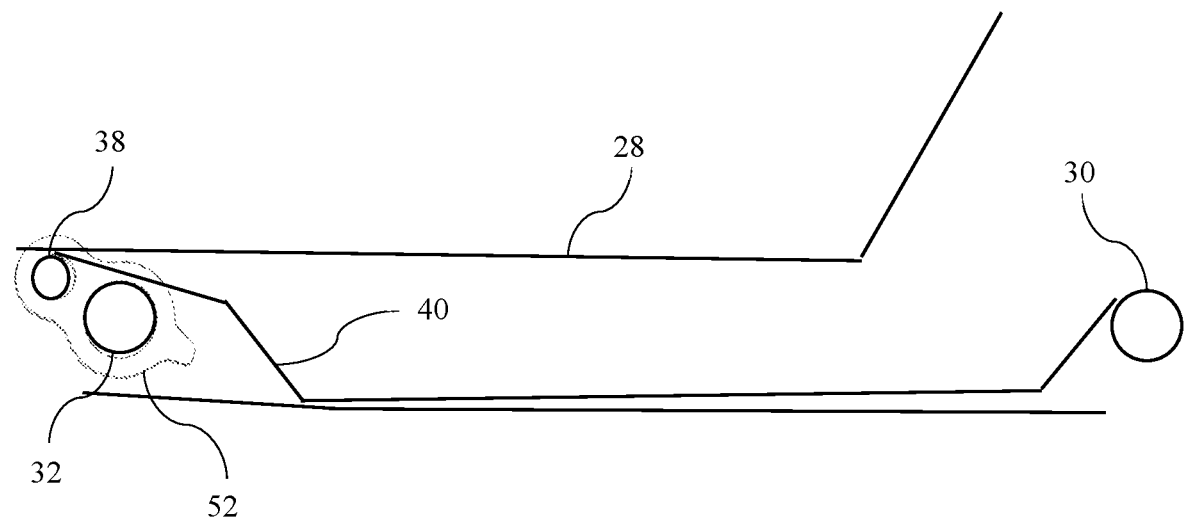
FIG. 5 is a side view of an anti-submarining system of a vehicle seat in a non-deployed state.
Figure 6:
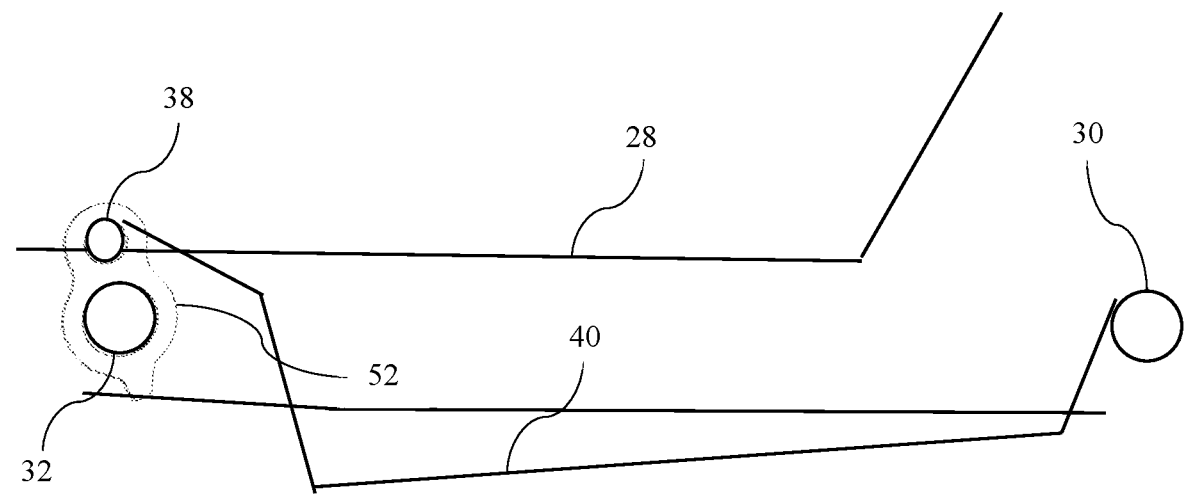
FIG. 6 is a side view of an anti-submarining system of a vehicle seat in a deployed state.

FIGS. 5 and 6 illustrate the positions of components in the normal and the deployed condition, respectively. Note that in the deployed position of FIG. 6, the cross tube 38 is above and rearward of the position it occupies in the normal condition of FIG. 5. Also note that the central portion of the flexible mat is lower in the deployed condition than in the normal condition. These changed positions both reduce the chance of the seat occupant slipping out of the seat under the lap belt.

Starting from the condition in FIG. 5, an occupant exerts force downward on the flexible mat 40. In the event of a collision, a large forward component is added to this force due to the occupant's inertia. This net force acts through the plate 50 of the flexible mat 40 and, if sufficiently large in magnitude, deflects the trigger rod 58 enough to release the cam 56. Tension in the flexible mat pulls on the cross tube 38. When the arm 52 is free to rotate, this tension pulls the cross tube upward and rearward around the pivot axis, resulting in the condition illustrated in FIG. 6.

Aspect 1. An assembly includes a seat frame, two arms, a cross tube, a bar, and a flexible mat. The two arms are supported for rotation about an axis with respect to the seat frame. Each arm has a cam lobe. The cross tube extends between the two arms. The bar extends across the seat frame and contacts the cam lobes preventing rotation of the arms. The flexible mat includes a front edge and a rear edge. The front edge is supported by the cross tube. The rear edge is supported by the seat frame. A forward force exerted on the flexible mat deforms the bar away from the cam allowing rotation of the arms and raising the cross tube.

Aspect 2. The assembly of aspect 1 wherein the arms support the cross tube on a first side of the axis and the cam lobes are located on a second side of the arms opposite the first side.

Aspect 3. The assembly of aspect 1 or 2 wherein the seat frame further includes a rear tube and a front tube extending between a left side rail and a right side rail.

Aspect 4. The assembly of aspect 3 wherein the front tube is concentric with the axis.

Aspect 5. The assembly of aspect 4 wherein the arms are pivotably supported on the front tube.

Aspect 6. The assembly of aspect 3 wherein the rear edge of the flexible mat is supported by the rear tube.

Aspect 7. The assembly of one of aspects 1 to 6 further including a seat cushion supported by the flexible mat.

Aspect 8. The assembly of one of aspects 1 to 7 wherein rotation of the arms moves the cross tube rearward.

Aspect 9. The assembly of aspect 8 wherein the flexible mat comprises a middle portion which moves downward when the cross tube is raised and moves rearward.

Aspect 10. An assembly includes a seat frame, a cross tube, a flexible mat, and a trigger. The cross tube is pivotably supported with respect to the seat frame. The flexible mat includes a front edge and a rear edge. The front edge is supported by the cross tube. The rear edge is supported by the seat frame. The trigger raises the cross tube relative to the seat frame in response to a forward force exerted on the flexible mat.

Aspect 11. The assembly of aspect 10 wherein the trigger includes two arms and a bar. The two arms are supported for rotation about an axis with respect to the seat frame. Each arm has a cam lobe. The cross tube extends between the two arms. The bar extends across the seat frame and contacts the cam lobes preventing rotation of the arms. The forward force exerted on the flexible mat deforms the bar away from the cam allowing rotation of the arms and raising the cross tube.

Aspect 12. The assembly of aspect 10 or 11 wherein the seat frame includes a rear tube and a front tube extending between a left side rail and a right side rail.

Aspect 13. The assembly of aspect 12 wherein the cross tube is pivotably supported on the front tube.

Aspect 14. The assembly of aspect 12 or 13 wherein the rear edge of the flexible mat is supported by the rear tube.

Aspect 15. The assembly of one of aspects 10 to 14 wherein the flexible mat further comprises a middle portion which moves downward when the cross tube is raised.

Aspect 16. An assembly includes a seat frame, two arms, a cross tube, a bar, and a flexible mat. The seat frame includes two side plates connected by a front tube and a rear tube. The two arms are supported for rotation about the front tube. Each arm has a cam lobe. The cross tube extends between the two arms forward and above the front tube. The bar extends across the seat frame and contacts the cam lobes preventing rotation of the arms. The flexible mat includes a front edge and a rear edge. The front edge is supported by the cross tube. The rear edge is supported by the rear tube.

A forward force exerted on the flexible mat below the front tube deforms the bar away from the cam allowing rotation of the arms and pulls the cross tube upward and rearward.

Aspect 17. The assembly of aspect 16 further including a seat cushion supported by the flexible mat.

Aspect 18. The assembly of aspect 16 or 17 wherein the flexible mat includes a middle portion which moves downward when the cross tube moves upward and rearward.

Further aspects are also contemplated, consistent with the above disclosed embodiments and their combinations.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments. In addition, the features of various implementing embodiments may be combined to form further embodiments of the invention.

What is claimed is:

1. An assembly, comprising:
   a seat frame;
   two arms supported for rotation about an axis with respect to the seat frame, each arm comprising a cam lobe;
   a cross tube extending between the two arms;
   a bar extending across the seat frame and contacting each of the cam lobe, the bar is configured to prevent rotation of the two arms; and
   a flexible mat comprising a front edge and a rear edge, the front edge is supported by the cross tube and the rear edge supported by the seat frame,
   wherein a forward force greater than a force threshold exerted on the flexible mat deforms the bar away from the cam lobe to rotate the two arms and thereby raising the cross tube.

2. The assembly of claim 1, wherein the two arms support the cross tube on a first side of the axis and each of the cam lob is located on a second side of the two arms opposite the first side.

3. The assembly of claim 1, wherein the seat frame comprises a rear tube and a front tube extending between a left side rail and a right side rail.

4. The assembly of claim 3, wherein the front tube is concentric with the axis.

5. The assembly of claim 4, wherein the two arms are pivotably supported on the front tube.

6. The assembly of claim 3, wherein the rear edge of the flexible mat is supported by the rear tube.

7. The assembly of claim 1, further comprising a seat cushion supported by the flexible mat.

8. The assembly of claim 1, wherein rotation of the two arms moves the cross tube rearward.

9. The assembly of claim 8, wherein the flexible mat further comprises a middle portion which moves downward when the cross tube is raised and moves rearward.

10. An assembly, comprising:
    a seat frame;
    a cross tube pivotably supported with respect to the seat frame;
    a flexible mat comprising a front edge and a rear edge, the front edge supported by the cross tube and the rear edge supported by the seat frame; and
    a trigger, the trigger in response to a forward force greater than a threshold exerted on a flexible mat deforms a bar extending across the seat frame raising the cross tube relative to the seat frame.

11. The assembly of claim 10, wherein the trigger comprises:
    two arms supported for rotation about an axis with respect to the seat frame, each arm comprising a cam lobe, the cross tube extending between the two arms,
    wherein the bar is configured to contact each of the cam lobe and prevent the rotation of the two arms, and wherein the forward force exerted on the flexible mat deforms the bar away from the cam lobe allowing rotation of the two arms and raising the cross tube.

12. The assembly of claim 10, wherein the seat frame comprises a rear tube and a front tube extending between a left side rail and a right side rail.

13. The assembly of claim 12, wherein the cross tube is pivotably supported on the front tube.

14. The assembly of claim 12, wherein the rear edge of the flexible mat is supported by the rear tube.

15. The assembly of claim 10, wherein the flexible mat further comprises a middle portion which moves downward when the cross tube is raised.

16. The assembly of claim 10, wherein the flexible mat further comprises a set of longitudinal wires supported on a rear tube of the seat frame via a plurality of rear hooks and supported on the cross tube via a plurality of front hooks.

17. The assembly of claim 16, wherein the flexible mat further comprises a plate attached to the longitudinal wires and contacting the bar, and wherein the forward force is exerted on the plate to deform the bar.

18. An assembly, comprising:
    a seat frame comprising two side plates connected by a front tube and a rear tube;
    two arms supported for rotation about the front tube, each arm comprising a cam lobe;
    a cross tube extending between the two arms forward and above the front tube;
    a bar extending across the seat frame and contacting each of the cam lobe, the bar is configured to prevent the rotation of the two arms; and
    a flexible mat comprising a front edge and a rear edge, the front edge supported by the cross tube and the rear edge supported by the rear tube,
    wherein a forward force greater than a threshold exerted on the flexible mat below the front tube deforms the bar away from the cam lobe allowing rotation of the two arms and pulls the cross tube upward and rearward.

19. The assembly of claim 18, further comprising a seat cushion supported by the flexible mat.

20. The assembly of claim 18, wherein the flexible mat further comprises a middle portion which moves downward when the cross tube moves upward and rearward.

* * * * *